(12) United States Patent
Ho et al.

(10) Patent No.: US 6,211,302 B1
(45) Date of Patent: Apr. 3, 2001

(54) RHEOLOGY MODIFICATION OF INTERPOLYMERS OF ALPHA-OLEFINS AND VINYLIDENE AROMATIC MONOMERS

(75) Inventors: Thoi H. Ho, Lake Jackson, TX (US); Ray E. Drumright, Midland, MI (US); Robert H. Terbrueggen, South Pasadena, CA (US); Clark H. Cummins, Midland, MI (US); Michael J. Mullins, Lake Jackson, TX (US); H. Craig Silvis, Midland, MI (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/129,155

(22) Filed: Aug. 5, 1998

Related U.S. Application Data

(60) Provisional application No. 60/057,582, filed on Aug. 27, 1997.

(51) Int. Cl.$^7$ .................................................. C08F 8/30
(52) U.S. Cl. ........................................ 525/333.5; 525/351
(58) Field of Search ................................. 525/333.5, 351

(56) References Cited

U.S. PATENT DOCUMENTS

| | | |
|---|---|---|
| 3,058,944 | 10/1962 | Breslow et al. . |
| 3,203,936 | 8/1965 | Breslow et al. . |
| 3,203,937 | 8/1965 | Breslow et al. . |
| 3,282,864 | 11/1966 | Best et al. . |
| 3,298,975 | 1/1967 | Feild et al. . |
| 3,336,268 | 8/1967 | Cox . |
| 3,341,480 | 9/1967 | Feild et al. . |
| 3,389,198 | 6/1968 | Taber . |
| 3,530,108 | 9/1970 | Oppenlander et al. . |
| 3,855,184 | 12/1974 | Bostick et al. .................. 260/79.3 R |
| 4,352,892 | 10/1982 | Lohmar . |
| 4,579,905 | 4/1986 | Krabbenhoft . |
| 4,694,025 | 9/1987 | Park . |
| 4,714,716 | 12/1987 | Park . |
| 5,037,895 | 8/1991 | Marker et al. . |
| 5,869,591 | * 2/1999 | McKay et al. ........................ 526/347 |

FOREIGN PATENT DOCUMENTS

| | | |
|---|---|---|
| 797917 | 11/1968 | (CA) . |
| 1024296 | 1/1978 | (CA) . |
| 1080619 | 8/1967 | (EP) . |
| 0 702 032 A2 | 3/1996 | (EP) . |
| 2 205 103 | 11/1988 | (GB) . |
| 50-133248 | 10/1975 | (JP) .............................. C08L/23/16 |
| 96/07681 | 3/1986 | (WO) . |

OTHER PUBLICATIONS

R. A. Abramovitch, "Polar Radicals in Aromatic Substitution", *Intra–Science Chemistry Reports*, pp. 211–218, (1969).

R. A. Abramovitch, G. N. Knaus, M. Pavlin, and W. D. Holcomb, "Reaction of Sulphonyl Azides with Unstrained Olefins", *J. Chem. Soc.*, pp. 2169–2172, (1974).

R. A. Abramovitch, T. Chellathurai, W. D. Holcomb, I. T. McMaster, and D. P. Vanderpool, "Intramolecular Insertion of Arylsulfonylnitrenes into Aliphatic Side Chains[1]", *J. Org. Chem.*, vol. 42, No. 17, pp. 2920–2926, (1977).

R. A. Abramovitch, S. B. Hendi, and A. O. Kress, "Pyrolysis of Phenylalkylsulphonyl Azides and 2–phenethyl Azidoformate. Selectivity of Sulphonylnitrenes and Contrast between Sulphonyl– and Carbonyl–nitrenes", *J. Chem. Soc., Chem. Commun.*, pp. 1087–1088, (1981).

R. A. Abramovitch, M. Ortiz, and S. P. McManus, "Reaction of Aromatic Sulfonyl Azides with Dienes", *J. Org. Chem.*, vol. 46, pp. 330–335, (1981).

H. Radusch, J. Ding, and M. Schulz, "Chemical coupling of polystyrene and polybutadiene in melt mixtures by using an organic sulfonylazide", *Die Angewandte Makromolekulare Chemie*, vol. 204, pp. 177–189, (1993).

N. Takashima, Y. Nakayama, "The Processings of Crosslinked Plastics", *Kogaku Kogyo* (*Chemical Industry*), pp. 34(378)–39(383), (1969).

D. S. Breslow, M. F. Sloan, N. R. Newburg, and W. B. Renfrow, "Thermal Reactions of Sulfonyl Azides", *J. Amer. Chem. Soc.*, vol. 91, pp. 2273–2279, (1969).

Derwent Chemical Abstract No. 77–02552Y of JP 51134762 A.

P. Mapleston, "PP foam sheet emerges as a contender for a range of applications", *Modern Plastics*, pp. 110–111, (1997).

* cited by examiner

*Primary Examiner*—Bernard Lipman

(57) ABSTRACT

The invention includes a process of preparing a coupled polymer comprising heating an admixture containing (1) at least one interpolymer of an alpha olefin and vinyl aromatic monomer and (2) a coupling amount of at least one poly (sulfonyl azide) to at least the decomposition temperature of the poly(sulfonyl azide) for a period sufficient for decomposition of at least about 80 weight percent of the poly (sulfonyl azide) and sufficient to result in a coupled polymer. The polymer preferably. comprises ethylene, and a vinyl aromatic monomer, preferably styrene. The amount of poly (sulfonyl azide) is preferably from about 0.01 to about 1 weight percent of the interpolymer and the reaction preferably takes place at a temperature greater than about 150° C., more preferably 185° C. The process optionally and in one preferred embodiment additionally comprises steps (b) fabricating an article from the coupled polymer and (c) crosslinking the fabricated coupled polymer. The invention additionally includes any composition produced by a process of the invention and any article made from the composition, preferably articles formed from a melt of the composition, more preferably by blow molding, blowing a film, foaming, or profile extruding, most preferably to form a coating for wire or cable, a tube, a gasket, a seal, roofing, or fiber. The article is optionally calendared. Additionally, the invention includes the use of compositions of the invention as starting materials for forming processes in which the composition is melted and especially in blow molding, blowing a film, foaming, or profile extruding, most preferably to form a coating for wire or cable, a tube, a gasket, a seal, roofing, or fiber.

20 Claims, No Drawings

RHEOLOGY MODIFICATION OF INTERPOLYMERS OF ALPHA-OLEFINS AND VINYLIDENE AROMATIC MONOMERS

This application claims the benefit of U.S. Provisional Application No. 60/057582, filed Aug. 27, 1997 which is hereby incorporated by reference herein in its entirety.

This invention relates to coupling of polyolefins, more specifically coupling of polyolefins using insertion into carbon hydrogen (C—H) bonds.

As used herein, the term "rheology modification" means change in melt viscosity of a polymer as determined by dynamic mechanical spectroscopy. Preferably the melt strength increases while maintaining the high shear viscosity (that is viscosity measured at a shear of 100 rad/sec by DMS) so that a polymer exhibits more resistance to stretching during elongation of molten polymer at low shear conditions (that is viscosity measured at a shear of 0.1 rad/sec by DMS) and does not sacrifice the output at high shear conditions.

Polyolefins are frequently rheology modified using non-selective chemistries involving free radicals generated for instance using peroxides or high energy radiation. However, chemistries involving free radical generation at elevated temperatures also degrade the molecular weight, especially in polymers containing tertiary hydrogen such as polystyrene, polypropylene, polyethylene copolymers etc. The reaction of polypropylene with peroxides and pentaerythritol triacrylate is reported by Wang et al., in Journal of Applied Polymer Science, Vol. 61, 1395–1404 (1996). They teach that branching of isotactic polypropylene can be realized by free radical grafting of di- and tri-vinyl compounds onto polypropylene. However, this approach does not work well in actual practice as the higher rate of chain scission tends to dominate the limited amount of chain coupling that takes place. This occurs because chain scission is an intra-molecular process following first order kinetics, while coupling chains is an inter-molecular process with kinetics that are minimally second order. Chain scission results in lower molecular weight and higher melt flow rate than would be observed were the branching not accompanied by scission. Because scission is not uniform, molecular weight distribution increases as lower molecular weight polymer chains referred to in the art as "tails" are formed.

The teachings of U.S. Pat. Nos. 3,058,944; 3,336,268; and 3,530,108 include the reaction of certain poly(sulfonyl azide) compounds with isotactic polypropylene or other polyolefins by nitrene insertion into C—H bonds. The product reported in U.S. Pat. No. 3,058,944 is crosslinked. The product reported in U.S. Pat. No. 3,530,108 is foamed and cured with cycloalkane- di(sulfonyl azide) of a given formula. In U.S. Pat. No. 3,336,268 the resulting reaction products are referred to as "bridged polymers" because polymer chains are "bridged" with sulfonamide bridges. The disclosed process includes a mixing step such as milling or mixing of the sulfonylazide and polymer in solution or dispersion then a heating step where the temperature is sufficient to decompose the sulfonylazide (100° C. to 225° depending on the azide decomposition temperature). The starting polypropylene polymer for the claimed process has a molecular weight of at least about 275,000. Blends taught in U.S. Pat. No. 3,336,268 have up to about 25 percent ethylene propylene elastomer.

U.S. Pat. No. 3,631,182 taught the use of azido formate for crosslinking polyolefins. U.S. Pat. No. 3,341,418 taught the use of sulfonyl azide and azidoformate compounds to crosslink of thermoplastics material(PP (polypropylene), PS (polystyrene),PVC (poly(vinyl chloride)) and their blends with rubbers(polyisobutene, EPM, etc.).

Similarly, the teachings of Canadian patent 797,917 (family member of NL 6,503,188) include rheology modification using from about 0.001 to 0.075 weight percent poly(sulfonyl azide) to modify homopolymer polyethylene and its blend with polyisobutylene.

Copending U.S. patent applications Ser. No. 08/921641 U.S. Pat. No. 5,869,591 and Ser. No. 08/921642 U.S. Pat. No. 5,977,271 both filed Aug. 27, 1997 disclose the use of peroxides, poly(sulfonyl azides) and other reactive materials to crosslink polymers including interpolymers of vinyl aromatic monomers and alpha-olefins.

It would be desirable to have polymers rheology modified rather than crosslinked (that is having less than about 2 percent gel as determined by xylene extraction specifically by ASTM 2765). Advantageously, interpolymers of alpha-olefins and vinyl aromatic monomers would exhibit higher shear thinning compared with the same polymers not coupled by the practice of the invention. Preferably, a process of the invention would result in more consistent coupling than methods of coupling involving free radicals, that is use of the same reactants, amounts and conditions would result in consistent amounts of coupling or consistent (reproducible) property changes, especially consistent amounts of gel formation. Preferably, a process would be less subject to effects from the presence of oxygen than would a coupling or rheology modification involving agents which generate free radicals.

SUMMARY OF THE INVENTION

Polymers coupled by reaction with coupling agents according to the practice of the invention advantageously have at least one of these desirable properties and preferably have desirable combinations of these properties.

The invention includes a process of preparing a coupled polymer comprising heating an admixture containing (1) at least one interpolymer of an alpha olefin and vinyl aromatic monomer and (2) a coupling amount of at least one poly (sulfonyl azide) to at least the decomposition temperature of the poly(sulfonyl azide) for a period sufficient for decomposition of at least about 80 weight percent of the poly (sulfonyl azide) and sufficient to result in a coupled polymer. The polymer preferably. comprises ethylene, and a vinyl aromatic monomer, preferably styrene. The amount of poly (sulfonyl azide) is preferably from about 0.01 to about 1 weight percent of the interpolymer and the reaction preferably takes place at a temperature greater than about 150° C., more preferably 185° C. The process optionally and in one preferred embodiment additionally comprises steps (b) fabricating an article from the coupled polymer and (c) crosslinking the fabricated coupled polymer. The invention additionally includes any composition obtainable by a process of the invention and any article made from the composition, preferably articles formed from a melt of the composition, more preferably by blow molding, blowing a film, foaming, or profile extruding, most preferably to form a coating for wire or cable, a tube, a gasket, a seal, roofing, or fiber. The article is optionally calendared. Additionally, the invention includes the use of compositions of the invention as starting materials for forming processes in which the composition is melted and especially in blow molding, blowing a film, foaming, or profile extruding, most preferably to form a coating for wire or cable, a tube, a gasket, a seal, roofing, or fiber.

DETAILED DESCRIPTION OF THE INVENTION

Practice of the invention is applicable to any thermoplastic polymer which has at least one C—H bond that can react with azide particularly interpolymers of vinyl aromatic monomers and alpha-olefins. The interpolymers employed in the present invention include substantially random interpolymers prepared by polymerizing one or more a-olefin monomers with one or more vinyl aromatic monomers and/or one or more hindered aliphatic or cycloaliphatic vinylidene monomers, and optionally with other polymerizable ethylenically unsaturated monomer(s).

Suitable (α-olefin monomers include for example, α-olefin monomers containing from 2 to about 20, preferably from 2 to about 12, more preferably from 2 to about 8 carbon atoms. Preferred such monomers include ethylene, propylene, butene-1, 4-methyl-1-pentene, hexene-1 and octene-1. Most preferred are ethylene or a combination of ethylene with C2–8 α-olefins. These α-olefins do not contain an aromatic moiety.

Suitable vinyl aromatic monomers which can be employed to prepare the interpolymers employed in the blends include, for example, those represented by the following formula:

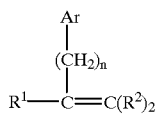

wherein R1 is selected from the group of radicals consisting of hydrogen and alkyl radicals containing from 1 to about 4 carbon atoms, preferably hydrogen or methyl; each R2 is independently selected from the group of radicals consisting of hydrogen and alkyl radicals containing from 1 to about 4 carbon atoms, preferably hydrogen or methyl; Ar is a phenyl group or a phenyl group substituted with from 1 to 5 substituents selected from the group consisting of halo, C1–4-alkyl, and C1–4-haloalkyl; and n has a value from zero to about 6, preferably from zero to 2, most preferably zero. Exemplary vinyl aromatic monomers include styrene, vinyl toluene, α-methylstyrene, t-butyl styrene, chlorostyrene, including all isomers of these compounds, and the like. Particularly suitable such monomers include styrene and lower alkyl- or halogen-substituted derivatives thereof. Preferred monomers include styrene, a-methyl styrene, the lower alkyl-(C1–C4) or phenyl-ring substituted derivatives of styrene, such as for example, ortho-, meta-, and para-methylstyrene, the ring halogenated styrenes, paravinyl toluene or mixtures thereof, and the like. A more preferred aromatic vinyl monomer is styrene.

By the term "hindered aliphatic or cycloaliphatic vinyl or vinylidene compounds", it is meant addition polymerizable vinyl or vinylidene monomers corresponding to the formula:

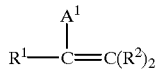

wherein Al is a sterically bulky, aliphatic or cycloaliphatic substituent of up to 20 carbons, R1 is selected from the group of radicals consisting of hydrogen and alkyl radicals containing from 1 to about 4 carbon atoms, preferably hydrogen or methyl; each $R^2$ is independently selected from the group of radicals consisting of hydrogen and alkyl radicals containing from 1 to about 4 carbon atoms, preferably hydrogen or methyl; or alternatively $R^1$ and $A^1$ together form a ring system. By the term "sterically bulky" is meant that the monomer bearing this substituent is normally incapable of addition polymerization by standard Ziegler-Natta polymerization catalysts at a rate comparable with ethylene polymerizations. Preferred aliphatic or cycloaliphatic vinyl or vinylidene monomers are those in which one of the carbon atoms bearing ethylenic unsaturation is tertiary or quaternary substituted. Examples of such substituents include cyclic aliphatic groups such as cyclohexyl, cyclohexenyl, cyclooctenyl, or ring alkyl or aryl substituted derivatives thereof, tert-butyl, norbornyl, and the like. Most preferred hindered aliphatic or cycloaliphatic vinyl or vinylidene compounds are the various isomeric vinyl-ring substituted derivatives of cyclohexene and substituted cyclohexenes, and 5-ethylidene-2-norbornene. Especially suitable are 1-, 3-, and 4-vinylcyclohexene.

Other optional polymerizable ethylenically unsaturated monomer(s) include strained ring olefins such as norbornene and C1–10 alkyl or C6–10 aryl substituted norbornenes, with an exemplary interpolymer being ethylene/styrene/norbornene.

The number average molecular weight (mn) of the polymers and interpolymers is usually greater than about 5.000, preferably from about 20,000 to about 1,000,000, more preferably from about 50,000 to about 500,000.

Polymerizations and unreacted monomer removal at temperatures above the autopolymerization temperature of the respective monomers may result in formation of some amounts of homopolymer polymerization products resulting from free radical polymerization. For example, while preparing the substantially random interpolymer, an amount of atactic vinyl aromatic homopolymer may be formed due to homopolymerization of the vinyl aromatic monomer at elevated temperatures. The presence of vinyl aromatic homopolymer, in general, is not detrimental for the purposes of the present invention and can be tolerated. The vinyl aromatic homopolymer may be separated from the interpolymer, if desired, by extraction techniques such as selective precipitation from solution with a non solvent for either the interpolymer or the vinyl aromatic homopolymer. For the purpose of the present invention it is preferred that no more than 20 weight percent, preferably less than 15 weight percent based on the total weight of the interpolymers of vinyl aromatic homopolymer is present.

The substantially random interpolymers are prepared by polymerizing a mixture of polymerizable monomers in the presence of metallocene or constrained geometry catalysts for instance as described in EP-A-0,416,815 by James C. Stevens et al. and U.S. Pat. No. 5,703,187 by Francis J. Timmers which are incorporated herein by reference in their entireties. Preferred operating conditions for such polymerization reactions are pressures from atmospheric up to 3,000 atmospheres and temperatures from −30° C. to 200° C.

Examples of suitable catalysts and methods for preparing the substantially random interpolymers are disclosed in U.S. application Ser. No. 07/702,475 filed May 20, 1991 now abandon corresponding to EP-A-514,828; as well as U.S. Pat. Nos.: 5,055,438; 5,057,475; 5,096,867; 5,064,802; 5,132,380; 5,189,192; 5,321,106; 5,347,024; 5,350,723; 5,374,696; 5,399,635; 5,470,993; 5,703,187 and 5,721,185 all of which patents and applications are incorporated herein by reference in their entireties.

For the purposes of rheology modification or coupling, the polymer is reacted with a polyfunctional compound capable of insertion reactions into C—H bonds. Such polyfunctional compounds have at least two, preferably 2, functional groups capable of C—H insertion reactions. Those skilled in the art are familiar with C—H insertion reactions and functional groups capable of such reactions. For instance, carbenes as generated from diazo compounds, as cited in Mathur, N. C.; Snow, M. S.; Young, K. M., and Pincock, J. A.; *Tetrahedron*, (1985), 41(8), pages 1509–1516, and nitrenes as generated from azides, as cited in Abramovitch, R. A.,; Chellathurai, T.; Holcomb, W. D; McMaster, I. T.; and Vanderpool, D. P.; *J. Org. Chem.*, (1977), 42(17), 2920–6, and Abramovitch, R. A., Knaus, G. N., *J. Org. Chem.*, (1975), 40(7), 883–9.

Compounds having at least two functional groups capable of C—H insertion under reaction conditions are referred to herein as coupling agents. Such coupling agents include alkyl and aryl azides (R—$N_3$) acyl azides (R—C(O)$N_3$), azidoformates (R—C—C(O)—$N_3$), phosphoryl azides ((RO)$_2$—(PO)—$N_3$), phosphinic azides ($R_2$—P(O)—$N_3$) and silyl azides ($R_3$—Si—$N_3$).

Polyfunctional compounds capable of insertions into C—H bonds also include poly(sulfonyl azide)s. The poly (sulfonyl azide) is any compound having at least two sulfonyl azide groups (—$SO_2N_3$) reactive with the polyolefin. Preferably the poly(sulfonyl azide)s have a structure X—R—X wherein each X is $SO_2N_3$ and R represents an unsubstituted or inertly substituted hydrocarbyl, hydrocarbyl ether or silicon-containing group, preferably having sufficient carbon, oxygen or silicon, preferably carbon, atoms to separate the sulfonyl azide groups sufficiently to permit a facile reaction between the polyolefin and the sulfonyl azide, more preferably at least 1, more preferably at least 2, most preferably at least 3 carbon, oxygen or silicon, preferably carbon, atoms between functional groups. While there is no critical limit to the length of R, each R advantageously has at least one carbon or silicon atom between X's and preferably has less than about 50, more preferably less than about 30, most preferably less than about 20 carbon, oxygen or silicon atoms. Within these limits, larger is better for reasons including thermal and shock stability. When R is straight-chain alkyl hydrocarbon, there are preferably less than 4 carbon atoms between the sulfonyl azide groups to reduce the propensity of the nitrene to bend back and react with itself. Silicon containing groups include silanes and siloxanes, preferably siloxanes. The term inertly substituted refers to substitution with atoms or groups which do not undesirably interfere with the desired reaction(s) or desired properties of the resulting coupled polymers. Such groups include fluorine, aliphatic or aromatic ether, siloxane as well as sulfonyl azide groups when more than two polyolefin chains are to be joined. Suitable structures include R as aryl, alkyl, aryl alkaryl, arylalkyl silane, siloxane or heterocyclic, groups and other groups which are inert and separate the sulfonyl azide groups as described. More preferably R includes at least one aryl group between the sulfonyl groups, most preferably at least two aryl groups (such as when R is 4,4' diphenylether or 4,4'-biphenyl). When R is one aryl group, it is preferred that the group have more than one ring, as in the case of naphthylene bis (sulfonyl azides). Poly(sulfonyl)azides include such compounds as 1,5-pentane bis(sulfonlazide), 1,8-octane bis (sulfonyl azide), 1,10-decane bis(sulfonyl azide), 1,10-octadecane bis(sulfonyl azide), 1-octyl-2,4,6-benzene tris (sulfonyl azide), 4,4'-diphenyl ether bis(sulfonyl azide), 1,6-bis(4'-sulfonazidophenyl)hexane, 2,7-naphthalene bis (sulfonyl azide), and mixed sulfonyl azides of chlorinated aliphatic hydrocarbons containing an average of from 1 to 8 chlorine atoms and from about 2 to 5 sulfonyl azide groups per molecule, and mixtures thereof. Preferred poly(sulfonyl azide)s include oxy-bis(4-sulfonylazidobenzene), 2,7-naphthalene bis(sulfonyl azido), 4,4'-bis(sulfonyl azido) biphenyl, 4,4'-diphenyl ether bis(sulfonyl azide) and bis(4-sulfonyl azidophenyl)methane, and mixtures thereof.

Sulfonyl azides are conveniently prepared by the reaction of sodium azide with the corresponding sulfonyl chloride, although oxidation of sulfonyl hydazines with various reagents (nitrous acid, dinitrogen tetroxide, nitrosonium tetrafluoroborate) has been used.

Polyfunctional compounds capable of insertions into C—H bonds also include carbene-forming compounds such as salts of alkyl and aryl hydrazones and diazo compounds, and nitrene-forming compounds such as alkyl and aryl azides (R—$N_3$), acyl azides (R—C(O)$N_3$), azidoformates (R—O—C)—$N_3$), sulfonyl azides (R—$SO_2$—$N_3$), phosphoryl azides ((RO)$_2$—(PO)—$N_3$), phosphinic azides ($R_2$—P(O)—$N_3$) and silyl azides ($R_3$—Si—$N_3$). Some of the coupling agents of the invention are preferred because of their propensity to form a greater abundance of carbon-hydrogen insertion products. Such compounds as the salts of hydrazones, diazo compounds, azidoformates, sulfonyl azides, phosphoryl azides, and silyl azides are preferred because they form stable singlet-state electron products (carbenes and nitrenes) which carry out efficient carbon-hydrogen insertion reactions, rather than substantially 1) rearranging via such mechanisms as the Curtius-type rearrangement, as is the case with acyl azides and phosphinic azides, or 2) rapidly converting to the triplet-state electron configuration which preferentially undergoes hydrogen atom abstraction reactions, which is the case with alkyl and aryl azides. Also, selection from among the preferred coupling agents is conveniently possible because of the differences in the temperatures at which the different classes of coupling agents are converted to the active carbene or nitrene products. For example, those skilled in the art will recognize that carbenes are formed from diazo compounds efficiently at temperatures less than 100° C., while salts of hydrazones, azidoformates and the sulfonyl azide compounds react at a convenient rate at temperatures above 100° C., up to temperatures of about 200° C. (By convenient rates it is meant that the compounds react at a rate that is fast enough to make commercial processing possible, while reacting slowly enough to allow adequate mixing and compounding to result in a final product with the coupling agent adequately dispersed and located substantially in the desired position in the final product. Such location and dispersion may be different from product to product depending on the desired properties of the final product.) Phosphoryl azides may be reacted at temperatures in excess of 180° C. up to about 300° C., while silyl azides react preferentially at temperatures of from about 250° C. to 400° C.

To modify rheology, also referred to herein as "to couple," the poly(sulfonyl azide) is used in a rheology modifying amount, that is an amount effective to increase the low-shear viscosity (at 0.1 rad/sec) of the polymer preferably at least about 5 percent as compared with the starting material polymer, but less than a crosslinking amount, that is an amount sufficient to result in at least about 2 weight percent gel as measured by ASTM D2765-procedure A. While those skilled in the art will recognize that the amount of azide sufficient to increase the low shear viscosity and result in less than about 2 weight percent gel will depend on molecular weight of the azide used and polymer the amount is preferably less than about 5 percent, more preferably less than about 2 percent, most preferably less than about 1 weight percent poly(sulfonyl azide) based on total weight of polymer when the poly(sulfonyl azide) has a molecular weight of from about 200 to about 2000. To achieve measurable rheology modification, the amount of poly(sulfonyl azide) is preferably at least about 0.01 weight percent, more preferably at least about 0.05 weight percent, most preferably at least about 0.10 weight percent based on total polymer.

For rheology modification, the sulfonyl azide is admixed with the polymer and heated to at least the decomposition temperature of the sulfonyl azide. By decomposition temperature of the azide it is meant that temperature at which the azide converts to the sulfonyl nitrene, eliminating nitrogen and heat in the process, as determined by differential scanning calorimetry (DSC). The poly(sulfonyl azide)begins to react at a kinetically significant rate (convenient for use in the practice of the invention) at temperatures of about 130° C. and is almost completely reacted at about 160° C. in a DSC (scanning at 10° C./min). ARC (scanning at 2° C./ hr) shows onset of decomposition is about 100° C. Extent of reaction is a function of time and temperature. At the low levels of azide used in the practice of the invention, the optimal properties are not reached until the azide is essentially fully reacted. Temperatures for use in the practice of the invention are also determined by the softening or melt temperatures of the polymer starting materials. For these reasons, the temperature is advantageously greater than about 90° C., preferably greater than about 120° C., more preferably greater than about 150° C., most preferably greater than 180° C.

Preferred times at the desired decomposition temperatures are times that are sufficient to result in reaction of the coupling agent with the polymer(s) without undesirable thermal degradation of the polymer matrix. Preferred reaction times in terms of the half life of the coupling agent, that is the time required for about half of the agent to be reacted at a preselected temperature, which half life is determinable by DSC is about 5 half lives of the coupling agent. In the case of a bis(sulfonyl azide), for instance, the reaction time is preferably at least about 4 minutes at 200° C.

Admixing of the polymer and coupling agent is conveniently accomplished by any means within the skill in the art. Desired distribution is different in many cases, depending on what rheological properties are to be modified. In a homopolymer it is desirable to have as homogeneous a distribution as possible, preferably achieving solubility of the azide in the polymer melt. In a blend it is desirable to have low solubility in one or more of the polymer matrices such that the azide is preferentially in one or the other phase, or predominantly in the interfacial region between the two phases.

Preferred processes include at least one of (a) dry blending the coupling agent with the polymer, preferably to form a substantially uniform admixture and adding this mixture to melt processing equipment, e.g. a melt extruder to achieve the coupling reaction, at a temperature at least the decomposition temperature of the coupling agent; (b) introducing, e.g. by injection, a coupling agent in liquid form, e.g. dissolved in a solvent therefor or in a slurry of coupling agent in a liquid, into a device containing polymer, preferably softened, molten or melted polymer, but alternatively in particulate form, in solution or dispersion, more preferably in melt processing equipment; (c) forming a first admixture of a first amount of a first polymer and a coupling agent, advantageously at a temperature less than about the decomposition temperature of the coupling agent, preferably by melt blending, and then forming a second admixture of the first admixture with a second amount of a second polymer (for example a concentrate of a coupling agent admixed with at least one polymer and optionally other additives, is conveniently admixed into a second polymer or combination thereof optionally with other additives, to modify the second polymer(s)); (d) feeding at least one coupling agent, preferably in solid form, more preferably finely comminuted, e.g. powder, directly into softened or molten polymer, e.g. in melt processing equipment, e.g. in an extruder; or combinations thereof. Among processes (a) through (d), processes (b) and (c) are preferred, with (c) most preferred. For example, process (c) is conveniently used to make a concentrate with a first polymer composition having a lower melting temperature, advantageously at a temperature below the decomposition temperature of the coupling agent, and the concentrate is melt blended into a second polymer composition having a higher melting temperature to complete the coupling reaction. Concentrates are especially preferred when temperatures are sufficiently high to result in loss of coupling agent by evaporation or decomposition not leading to reaction with the polymer, or other conditions would result that effect. Alternatively, some coupling occurs during the blending of the first polymer and coupling agent, but some of the coupling agent remains unreacted until the concentrate is blended into the second polymer composition. Each polymer or polymer composition includes at least one homopolymer, copolymer, terpolymer, or interpolymer and optionally includes additives within the skill in the art. When the coupling agent is added in a dry form it is preferred to mix the agent and polymer in a softened or molten state below the decomposition temperature of the coupling agent then to heat the resulting admixture to a temperature at least equal to the decomposition temperature of the coupling agent.

The term "melt processing" is used to mean any process in which the polymer is softened or melted, such as extrusion, pelletizing, molding, thermoforming, film blowing, compounding in polymer melt form, fiber spinning, and the like.

The polyolefin(s) and coupling agent are suitably combined in any manner which results in desired reaction thereof, preferably by mixing the coupling agent with the polymer(s) under conditions which allow sufficient mixing before reaction to avoid uneven amounts of localized reaction then subjecting the resulting admixture to heat sufficient for reaction. Preferably, a substantially uniform admixture of coupling agent and polymer is formed before exposure to conditions in which chain coupling takes place. A substantially uniform admixture is one in which the distribution of coupling agent in the polymer is sufficiently homogeneous to be evidenced by a polymer having a melt viscosity after treatment according to the practice of the invention either higher at low angular frequency (e.g. 0.1 rad/sec) or lower at higher angular frequency (e.g. 100 rad/sec) than that of the same polymer which has not been treated with the coupling agent but has been subjected to the same shear and thermal history. Thus, preferably, in the practice of the invention, decomposition of the coupling agent occurs after mixing sufficient to result in a substantially uniform admixture of coupling agent and polymer. This mixing is preferably attained with the polymer in a molten or melted state, that is above the crystalline melt temperature, or in a dissolved or finely dispersed condition rather than in a solid mass or particulate form. The molten or melted form is more preferred to insure homogeneity rather than localized concentrations at the surface.

Any equipment is suitably used, preferably equipment which provides sufficient mixing and temperature control in the same equipment, but advantageously practice of the invention takes place in such devices as an extruder or a static polymer mixing devise such as a Brabender blender. The term extruder is used for its broadest meaning to include such devices as a device which extrudes pellets or pelletizer. Conveniently, when there is a melt extrusion step between production of the polymer and its use, at least one step of the process of the invention takes place in the melt extrusion step.

While it is within the scope of the invention that the reaction take place in a solvent or other medium, it is preferred that the reaction be in a bulk phase to avoid later steps for removal of the solvent or other medium. For this purpose, a polymer above the crystalline melt temperature is advantageous for even mixing and for reaching a reaction temperature (the decomposition temperature of the sulfonyl azide).

In a preferred embodiment the process of the present invention takes place in a single vessel, that is mixing of the coupling agent and polymer takes place in the same vessel as heating to the decomposition temperature of the coupling agent. The vessel is preferably a twin-screw extruder, but is also advantageously a single-screw extruder or a batch mixer. The reaction vessel more preferably has at least two zones of different temperatures into which a reaction mixture would pass, the first zone advantageously being at a temperature at least the crystalline melt temperature or the softening temperature of the polymer(s) and preferably less than the decomposition temperature of the coupling agents and the second zone being at a temperature sufficient for decomposition of the coupling agent. The first zone is preferably at a temperature sufficiently high to soften the polymer and allow it to combine with the coupling agent through distributive mixing to a substantially uniform admixture.

For polymers that have softening points above the coupling agent decomposition temperature (preferably greater than 200° C.), and especially when incorporation of a lower melting polymer (such as in a concentrate) is undesirable, the preferred embodiment for incorporation of coupling agent is to solution blend the coupling agent in solution or admixture into the polymer, to allow the polymer to imbibe (absorb or adsorb at least some of the coupling agent), and then to evaporate the solvent. After evaporation, the resulting mixture is extruded. The solvent is preferably a solvent for the coupling agent, and more preferably also for the polymer when the polymer is soluble such as in the case of polycarbonate. Such solvents include polar solvents such as acetone, THF (tetrahydrofuran) and chlorinated hydrocarbons such as methylene chloride. Alternatively other non-polar compounds such as mineral oils in which the coupling agent is sufficiently miscible to disperse the coupling agent in a polymer, are used.

To avoid the extra step and resultant cost of re-extrusion and to insure that the coupling agent is well blended into the polymer, in alternative preferred embodiments it is preferred that the coupling agent be added to the post-reactor area of a polymer processing plant. For example, in a slurry process of producing polyethylene, the coupling agent is added in either powder or liquid form to the powdered polyethylene after the solvent is removed by decantation and prior to the drying and densification extrusion process. In an alternative embodiment, when polymers are prepared, in a gas phase process, the coupling agent is preferably added in either powder or liquid form to the powdered polyethylene before the densification extrusion. In an alternative embodiment when a polymer is made in a solution process, the coupling agent is preferably added to the polymer solution prior to the densification extrusion process.

Practice of the process of the invention to rheology modify polymers yields rheology modified or chain coupled polymers, that is the polymers which have sulfonamide, amine, alkyl-substituted or aryl-substituted carboxamide, alkyl-substituted or aryl-substituted phosphoramide, alkyl-substituted or aryl-substituted methylene coupling between different polymer chains. Resulting compounds advantageously show higher low shear viscosity than the original polymer due to coupling of long polymer chains to polymer backbones.

Rheology modification leads to polymers which have controlled theological properties, specifically improved melt strength as evidenced by increased low shear viscosity (at 0.1 rad/sec), higher orientation in high shear and high extensional processes such as injection molding, film extrusion (blown and cast), calendaring, fiber production, profile extrusion, foams, and wire & cable insulation.

Rheology modified polymers are useful as large blow molded articles due to the higher low shear viscosity than unmodified polymer and the maintenance of the high shear viscosity for processability as indicated by high shear viscosity, in profile extrusion because of high melt strength to avoid sagging or deformation of parts coming from the die as measured by low shear viscosity, as blown film for better bubble stability as measured by low shear viscosity, as fibers for better spinnability as measured by high shear viscosity, in cable and wire insulation for green strength to avoid sagging or deformation of the polymer on the wire as measured by low shear viscosity which are aspects of the invention.

Polymers rheology modified according to the practice of the invention are superior to the corresponding unmodified polymer starting materials for these applications due to the elevation of viscosity, of preferably at least about 5 percent at low shear rates (0.1 rad/sec), sufficiently high melt strengths to avoid deformation during thermal processing (e.g. to avoid sag during thermoforming) or to achieve bubble strength during blow molding, and sufficiently low high shear rate viscosities to facilitate molding and extrusion. These rheological attributes enable faster filling of injection molds at high rates than the unmodified starting materials, the setup of foams (stable cell structure)as indicated by formation of lower density closed cell foam, preferably with higher tensile strength, insulation properties, and/or compression set than attained in the use of coupling or rheology modification using coupling agents which generate free radicals, because of high melt viscosity Advantageously toughness and tensile strength of the starting material is maintained.

Polymers resulting from the practice of the invention are different from those resulting from practice of prior art processes as shown in CA 797,917. The polymers of the present invention are more flexible (lower flexural modulus measured by ASTM D 790-92) and lower hardness (measured by ASTM D 2240-91) than the linear polyethylene disclosed in Canadian patent document 797,917. The polymers of the present invention show improved melt elasticity, that is higher tan delta as measured by DMS, better drawability, that is higher melt strength as measured by melt tension than the unmodified polymer. counterpart in thermoforming and large part blow molding. Especially in the case of interpolymers of alpha-olefins and vinyl aromatic monomers, there is better shear thinning (that is higher) than is exhibited by the starting material.

There are many types of molding operations which can be used to form useful fabricated articles or parts from the formulations disclosed herein, including various injection molding processes (e.g., that described in *Modern Plastics Encvclopedia*/89, Mid October 1988 Issue, Volume 65, Number 11, pp. 264–268, "Introduction to Injection Molding" and on pp. 270–271, "Injection Molding Thermoplastics", the disclosures of which are incorporated herein by reference) and blow molding processes (e.g., that described in *Modern Plastics Encyclopedia*/89, Mid October 1988 Issue, Volume 65, Number 11, pp. 217–218, "Extrusion-Blow Molding", the disclosure of which is incorporated herein by reference), profile extrusion, calendering, pultrusion and the like.

The rheology-modified interpolymers of vinyl aromatic monomers and alpha-olefins, processes for making them, and intermediates for making them of this invention are useful in the automotive area, industrial goods, building and construction, electrical (e.g., wire and cable coatings/insulation) and tire products. Some of the fabricated articles include automotive hoses, single ply roofing, and wire and cable voltage insulation and jackets.

Film and film structures particularly benefit from this invention and can be made using conventional hot blown film fabrication techniques or other biaxial orientation processes such as tenter frames or double bubble processes. Conventional hot blown film processes are described, for example, in *The Encyclopedia of Chemical Technology*, Kirk-Othmer, Third Edition, John Wiley & Sons, New York, 1981, vol. 16, pp. 416–417 and Vol. 18, pp. 191–192. Biaxial orientation film manufacturing process such as described in a "double bubble" process as in U.S. Pat. No. 3,456,044 (Pahlke), and the processes described in U.S. Pat. No. 4,352,849 (Mueller), U.S. Pat. No. 4,597,920 (Golike), U.S. Pat. No. 4,820,557 (Warren), U.S. Pat. No. 4,837,084 (Warren), U.S. Pat. No. 4,865,902 (Golike et al.), U.S. Pat. No. 4,927,708 (Herran et al.), U.S. Pat. No. 4,952,451 (Mueller), U.S. Pat. No. 4,963,419 (Lustig et al.), and U.S. Pat. No. 5,059,481 (Lustig et al.), can also be used to make film structures from the novel compostions described herein. The film structures can also be made as described in a tenter-frame technique, such as that used for oriented polypropylene.

Other multi-layer film manufacturing techniques for food packaging applications are described in *Packaging Foods With Plastics*, by Wilmer A. Jenkins and James P. Harrington (1991), pp. 19–27, and in "Coextrusion Basics" by Thomas I. Butler, Film Extrusion Manual: *Process, Materials, Properties* pp. 31–80 (published by the TAPPI Press (1992)).

The films may be monolayer or multilayer films. The film made using this invention can also be coextruded with the other layer(s) or the film can be laminated onto another layer(s) in a secondary operation, such as that described in *Packaging Foods With Plastics*, by Wilmer A. Jenkins and James P. Harrington (1991) or that described in "Coextrusion For Barrier Packaging" by W. J. Schrenk and C. R. Finch, *Society of Plastics Engineers RETEC Proceedings*, June 15–17 (1981), pp. 211–229. If a monolayer film is produced via tubular film (i.e., blown film techniques) or flat die (i.e., cast film) as described by K. R. Osborn and W. A. Jenkins in "Plastic Films, Technology and Packaging Applications" (Technomic Publishing Co., Inc., 1992), the disclosure of which is incorporated herein by reference, then the film must go through an additional post-extrusion step of adhesive or extrusion lamination to other packaging material layers to form a multilayer structure. If the film is a coextrusion of two or more layers (also described by Osborn and Jenkins), the film may still be laminated to additional layers of packaging materials, depending on the other physical requirements of the final film. "Laminations vs. Coexcrusion" by D. Dumbleton (Converting Magazine (September 1992), also discusses lamination versus coextrusion. Monolayer and coextruded films can also go through other post extrusion techniques, such as a biaxial orientation process.

Extrusion coating is yet another technique for producing multilayer film structures using the novel compositions described herein. The novel compositions comprise at least one layer of the film structure. Similar to cast film, extrusion coating is a flat die technique. A sealant can be extrusion coated onto a substrate either in the form of a monolayer or a coextruded extrudate.

Generally for a multilayer film structure, the novel compositions described herein comprise at least one layer of the total multilayer film structure. Other layers of the multilayer structure include but are not limited to barrier layers, and/or tie layers, and/or structural layers. Various materials can be used for these layers, with some of them being used as more than one layer in the same film structure. Some of these materials include: foil, nylon, ethylene/vinyl alcohol (EVOH) copolymers, polyvinylidene chloride (PVDC), polyethylene terethphalate (PET), oriented polypropylene (OPP), ethylene/vinyl acetate (EVA) copolymers, ethylene/acrylic acid (EAA) copolymers, ethylene/methacrylic acid (EMAA) copolymers, LLDPE, HDPE, LDPE, nylon, graft adhesive polymers (e.g., maleic anhydride grafted polyethylene), and paper. Generally, the multilayer film structures comprise from 2 to 7 layers.

Articles prepared from interpolymers of ethylene and a vinyl aromatic monomer are optionally and advantageously crosslinked subsequent to shaping (fabrication). Crosslinking before fabrication often results in localized gels that undesirably introduce flaws. Flaws are sometimes visible or can reduce such characteristics as tensile properties or toughness of the final article, crosslinking after fabrication. Introduced in a step subsequent to fabrication, the crosslinked net work of polymer is advantageously distributed evenly in the resulting article so that the reduction in tensile properties is minimized. The crosslinking in the second step is optionally accomplished using any means within the skill in the art, for instance radiation, including e-beam radiation, or heat. In the case crosslinking by heat, peroxide, azide and other crosslinking agents are conveniently added before the article is fabricated and the fabrication temperature is desirably lower than the decomposition of the crosslinking agent. One means within the skill in the art for achieving a sufficiently low fabrication temperature is adding oil to the resin to reduce the viscosity. The crosslinked article advantageously has lower compression set as measured by ASTM D 395-89 than the article before crosslinking. Such articles are optionally and alternatively made by melt processing an intermediate composition comprising a rheology modified interpolymer of the invention which contains unreacted crosslinking agent. The crosslinking agent is optionally included in a composition including the poly(sulfonyl azide) before the decomposition temperature of the poly(sulfonyl azide) is reached or alternatively added after coupling. If the crosslinking agent is added before the decomposition temperature of the poly(sulfonyl azide) is reached then the crosslinking agent should be insufficiently reactive under coupling conditions to cause sufficient crosslinking to introduce detrimental amounts of localized gels. (Those skilled in the art will recognize that the amounts of gel which are detrimental vary with the final article to be produced.) In such a case the crosslinking agent is conveniently activated at a higher temperature or by different conditions than are encountered in coupling. More preferably, crosslinking agent is added to coupled interpolymer or the fabricated article is exposed to radiation. In another embodiment, an amount of poly(sulfonyl azide) sufficient for coupling and later crosslinking is used in a composition and exposed to sufficient heat for a sufficient time to couple the interpolymer but to form less than about 2 weight percent gel, then the composition is fabricated into an article, after which the article is heated to decompose sufficient poly(sulfonyl azide) to result in crosslinking. Oils, plasticizers, fillers, colorants, and antioxidants are optionally added to the rheology modified interpolymers during the article fabrication process. Examples of the use of rheology modified interpolymers in crosslinked applications include gaskets, wire and cable coatings, roofing membranes, foams, weather stripping, hoses and the like where the parts advantageously have low compression set and elevated service temperature.

The rheology-modified polymers and intermediates used to make rheology-modified polymers may be used alone or in combination with one or more additional polymers in a polymer blend. When additional polymers are present, they may be selected from any of the modified or unmodified homogeneous polymers described above for this invention arid/or any modified or unmodified heterogeneous polymers.

The heterogeneous polyethylenes that may be combined with the rheology-modified polymers according to this invention fall into two broad categories, those prepared with a free radical initiator at high temperature and high pressure, and those prepared with a coordination catalyst at high temperature and relatively low pressure. The former are generally known as low density polyethylenes (LDPE) and are characterized by branched chains of polymerized monomer units pendant from the polymer backbone. LDPE polymers generally have a density between about 0.910 and 0.935 g/cc. Ethylene polymers and copolymers prepared by the use of a coordination catalyst, such as a Ziegler or Phillips catalyst, are generally known as linear polymers because of the substantial absence of branch chains of polymerized monomer units pendant from the backbone. High density polyethylene (HDPE), generally having a density of about 0.941 to about 0.965 g/cc, is typically a homopolymer of ethylene, and it contains relatively few branch chains relative to the various linear copolymers of ethylene and an α-olefin. HDPE is well known, commercially available in various grades, and may be used in this invention.

Linear copolymers of ethylene and at least one α-olefin of 3 to 12 carbon atoms, preferably of 4 to 8 carbon atoms, are also well known and commercially available. As is well known in the art, the density of a linear ethylene/α-olefin copolymer is a function of both the length of the α-olefin and the amount of such monomer in the copolymer relative to the amount of ethylene, the greater the length of the α-olefin and the greater the amount of α-olefin present, the lower the density of the copolymer. Linear low density polyethylene (LLDPE) is typically a copolymer of ethylene and an α-olefin of 3 to 12 carbon atoms, preferably 4 to 8 carbon atoms (e.g., 1-butene, 1-octene, etc.), that has sufficient α-olefin content to reduce the density of the copolymer to that of LDPE. When the copolymer contains even more α-olefin, the density will drop below about 0.91 g/cc and these copolymers are known as ultra low density polyethylene (ULDPE) or very low density polyethylene (VLDPE). The densities of these linear polymers generally range from about 0.87 to 0.91 g/cc.

Both the materials made by the free radical catalysts and by the coordination catalysts are well known in the art, as are their methods of preparation. Heterogeneous linear ethylene polymers are available from The Dow Chemical Company as Dowlex™ LLDPE and as Attane™ ULDPE resins. Heterogeneous linear ethylene polymers can be prepared via the solution, slurry or gas phase polymerization of ethylene and one or more optional α-olefin comonomers in the presence of a Ziegler Natta catalyst, by processes such as are disclosed in U.S. Pat. No. 4,076,698 to Anderson et al., which is incorporated herein by reference. Preferably, heterogeneous ethylene polymers are typically characterized as having molecular weight distributions, $M_w/M_n$, in the range of from 3.5 to 4.1. Relevant discussions of both of these classes of materials, and their methods of preparation are found in U.S. Pat. No. 4,950,541 and the patents to which it refers, all of which are incorporated herein by reference.

The following examples are to illustrate this invention and do not limit it. Ratios, parts, and percentages are by weight unless otherwise stated. Examples (Ex) of the invention are designated numerically while comparative samples (C.S.) are designated alphabetically and are not examples of the invention.

TEST METHODS

The viscosity of polymer as a function of shear rate was measured according to the following method. A dynamic mechanical spectrometer commercially available from Rheometrics, Inc. under the trade designation RMS-800 with 25 mm diameter parallel plates was used to determine the dynamic Theological data. A frequency sweep with five logarithmically spaced points per decade was run from 0.1 to 100 rad/s at 190° C. The strain was determined to be within the linear viscoelastic regime by performing a strain sweep at 0.1 rad/s and 190° C., by strain sweep from 2 to 30% strain in 2% steps to determine the minimum required strain to produce torques within the specification of the transducer; another strain sweep at 100 rad/s and 190° C. was used to determine the maximum strain before nonlinearity occurred according to the procedure disclosed by J. M. Dealy and K. F. Wissbrun, "Melt Rheology and Its Role in Plastics Processing", Van Nostrand, New York (1990).

All testing was performed in a nitrogen purge to minimize oxidative degradation.

The storage modulus (G') (including in Table 5) was measured according to the following method. A dynamic mechanical spectrometer commercially available from Rheometrics Inc. under the trade designation RDA-II was used to obtain DMS data. A temperature sweep was run from approximately −70° C. to 300° C. at 5° C./step with 30 s equilibration delay at each step. The oscillatory frequency was 1 radian/s with an autostrain function of 0.1 percent strain initially, increasing in positive 100 percent adjustments whenever the torque decreased to 4 g-cm. The maximum strain was set at 26 percent. The 7.9-mm parallel plate fixtures were used with an initial gap of 1.5 mm at 160° C. (the sample was inserted into the RDA-II at 160° C.). The "Hold" function was engaged at 160° C. and the instrument was cooled to −70° C. and the test started. (The Hold function corrects for the thermal expansion or contraction as the test chamber is heated or cooled.) A nitrogen environment was maintained throughout the experiment to minimize oxidative degradation.

A thermomechanical analyzer (TMA) commercially available from Perkin Elmer Corporation under the trade designation model TMA 7 was used to measure the upper service temperature (UST). Probe force of 102 g and heating rate of 5° C./min were used. Each test specimen was a disk with thickness of about 2 mm and diameter, prepared by compression molding at 205° C. and air-cooling to room temperature.

Xylene Extraction to determine gel content was performed by weighing out 1 gram samples of polymer. The samples are transferred to a mesh basket which is then placed in boiling xylene for 12 hours. After 12 hours, the sample baskets are removed and placed in a vacuum oven at 150° C. and 28 in. of Hg vacuum for 12 hours. After 12 hours, the samples are removed, allowed to cool to room temperature over a 1 hour period, and then weighed. The results are reported as percent polymer extracted. Percent extracted=(initial weight-final weight)/initial weight according to ASTM D-2765 Procedure "A".

Tensile properties were determined by compression molding 1/16 inch plaques. Tensile specimens were then cut from these plaques and tested on an instrument commercially available from Instron Corporation under the trade designation Instron model 1122 load frame using 0.870 inch (2.2 cm) micro-tensile samples measured at an extension rate of 5 inch/min (12.7 cm/min). Tensile at break and elongation at break, were measured in accordance with ASTM D-412. The toughness was measured as the area under the stress/strain curve.

The melt index was measured according to ASTM D-1238 condition 190° C./2.16 Kg(formerly known as Condition E).

The Gottfert or Rheoten melt strength was measured using a capillary rheometer commercially available from Instron Corporation under the trade designation Instron Capillary Model 3211 coupled with a melt strength tester commercially available from Gottfert Inc. under the trade designation Goettfert Rheotens. A capillary rheometer is used to deliver a polymer melt through a die at a constant throughput rate. The melt strength tester is used to uniaxially stretch the molten polymer filament using nip rolls. The required tensile force is recorded as a function of the take-up speed of the nip rolls of the melt strength tester. The maximum tensile force attained during the test is defined as the melt strength. In the case of polymer melt exhibiting draw resonance, the tensile force before the onset of draw resonance was taken as melt strength. The force values were not corrected for the weight of the extrudate hanging between the nip rolls and bottom plate.

TABLE 1

Conditions for Rheotens melt strength measurement

| | Rheotens Melt Strength Method |
|---|---|
| Mode of Polymer Delivery | Constant Shear Rate (Instron, piston 25.4 mm/min) for I2 = 1.0, Q = 1.35 g/min |
| Shear Rate at die wall | 33 s$^{-1}$ |
| Temperature | 190° C. |
| Die Diameter | 2.1 mm |
| Die Length | 42 mm |
| L/D | 20 |
| air gap | 100 mm |
| velocity at which melt tension or melt strength is measured: | variable |
| (a) MI > 5.0 | |
| (b) MI < 5.0 | |
| acceleration | 2.4 mm/s$^2$ |
| Reported Data | (1) Melt Strength - maximum tensile force at break or at the onset of draw resonance (2) Draw ratio at break ($V_b/V_o$) or the at the onset of draw resonance ($V_r/V_o$) (3) Complete tensile force vs velocity curve |

MI is melt index measured in g/10 min

All instruments were used according to manufacturer's directions.

EXAMPLES

Interpolymers of alpha-olefins and vinyl aromatic polymers used in the examples are also referred to herein as Ethylene Styrene Interpolymers (ESI) and are synthesized according to the following general procedure:

Reactor Description

A 6 gallon (22.7 L), oil jacketed, autoclave continuously stirred tank reactor (CSTR) was employed as the reactor. A magnetically coupled agitator with impellers commercially available from Lightning Mixers, Inc. under the trade designation A-320 impellers provides the mixing. The reactor ran liquid full at 475 psig (3,275 kPa). Process flow was in the bottom and out the top. A heat transfer oil was circulated through the jacket of the reactor to remove some of the heat of reaction. After the exit from the reactor there was a flow meter that measured flow and solution density. All lines on the exit of the reactor were traced with 50 psi (344.7 kPa) steam and insulated.

Procedure

Solvent (ethylbenzene for ESI-1 and ESI-2 and toluene for ESI-3 and ESI-4) was supplied to the reactor at 30 psig (207 kPa). The feed to the reactor was measured by a mass flow meter. A variable speed diaphragm pump controlled the feed rate of solvent. At the discharge of the solvent pump, a side stream was taken to provide flush flows for the catalyst injection line (1 lb/hr (0.45 kg/hr)) and the reactor agitator (0.75 lb/hr (0.34 kg/hr)). These flows were measured by differential pressure flow meters and controlled by manual adjustment of micro-flow needle valves. Uninhibited styrene monomer was supplied to the reactor at 30 psig (308 kPa). The feed to the reactor was measured by a mass flow meter. A variable speed diaphragm pump controlled the feed rate. The styrene stream was mixed with the remaining solvent stream. Ethylene was supplied to the reactor at 600 psig (4,238 kPa). The ethylene stream was measured by a mass flow meter just prior to a valve controlling flow. A flow meter controller was used to deliver hydrogen into the ethylene stream at the outlet of the ethylene control valve. The ethylene/hydrogen mixture combines with the solvent/styrene stream at ambient temperature. The temperature of the solvent/monomer as it enters the reactor was reduced to about 5° C. by a heat exchanger with -5° C. glycol on the jacket thereof. This solvent/styrene stream entered the bottom of the reactor. The three component catalyst system described in Table 2 and its solvent flush also enter the reactor at the bottom but through a different port than the monomer stream. Preparation of the catalyst components took place in an inert atmosphere glove box. The diluted components were put in nitrogen padded cylinders and charged to catalyst run tanks for the reaction. From these run tanks the catalyst was pressured with piston pumps and the flow was measured with flow meters. These streams combine with each other and the catalyst flush solvent just prior to entry through a single injection line into the reactor where they react to form the designated polymers.

Polymerization was stopped as reaction mixture flowed into a reactor product line after the reactor, by addition of catalyst kill (water mixed with solvent) into the reactor product line after a flow meter which measures solution density. A static mixer in the line provided dispersion of the catalyst kill and additives in the reactor effluent stream. This stream next entered post reactor heaters that provide additional energy for the solvent removal flash. This flash occurred as the effluent exited the post reactor heater and the pressure was dropped from 475 psig (3,275 kPa) down to ~250 mm Hg (33 kPa) of pressure absolute at the reactor pressure control valve. This flashed polymer entered a hot oil jacketed devolatilizer. Approximately 85 percent of the volatile compounds (hereinafter volatiles) were removed from the polymer in the devolatilizer. The volatiles exited the top of the devolatilizer. The stream of exiting volatiles was condensed and with a glycol jacketed exchanger, entered the suction of a vacuum pump and was discharged to a glycol jacket solvent and styrene/ethylene separation vessel. Solvent and styrene were removed from the bottom of the vessel and ethylene from the top. The ethylene stream was measured with a flow meter and analyzed for composition. The measurement of vented ethylene plus a calculation of the dissolved gasses in the solvent/styrene stream were used to calculate the ethylene conversion. The polymer separated in the devolatilizer was pumped out with a gear pump to an extruder commercially available from Werner Pfleiderer Corporation under the trade designation ZSK-30 devolatilizing vacuum extruder. The dry polymer exited the extruder as a single strand. This strand was cooled as it was pulled through a water bath. The excess water was blown from the strand with air and the strand was chopped into pellets with a strand chopper.

The catalyst used in preparing ESI-1 and ESI 2 was (t-butylamido) dimethyl(tetramethylcyclopentadienyl) silane-titanium (II) 1,3-pentadiene. The catalyst used in preparing ESI 3 and ESI 4 was Titanium, [1,1'-(η4–1,3-butadiene-1,4-diyl)bis[benzene]][1-[(1,2,3,3a,11b-η)-1H-cyclopenta[1]phenanthren-1-yl]-N-(1,1-dimethylethyl)-1,1-dimethylsilanaminato(2-)-N]-dimethyl. The cocatalyst was bis-hydrogenated tallowalkyl methylammonium tetrakis (pentafluorophenyl)borate. A modified methylaluminoxane commercially available from Akzo Nobel under the trade designation MMAO-3A was also used in the amounts indicated in Tables 2a and 2b and is referred to herein as MMAO.

TABLE 2a

Catalyst to Cocatalyst ratio and MMAO to Catalyst Ratio

| | Cocatalyst: Boron/Ti Ratio | MMAO: Al/TI Ratio |
|---|---|---|
| ESI-1 (Example1) | 1.25:1 | 10.0:1 |
| ESI-2 (Example2) | 1.24:1 | 10.0:1 |

TABLE 2b

Catalyst and Cocatalyst employed in ESI-3 and ESI-4 (U.S. units)

| Sample | Cat flow (lb/hr) | Cat conc (ppm) | CoCat Flow (lb/hr) | Co Cat Conc ppm | MMAO Flow (lb/hr) | MMAO Conc. (ppm) |
|---|---|---|---|---|---|---|
| ESI-3 | 0.286 | 10 | 0.279 | 326.3 | 0.46 | 17.6 |
| ESI-4 | 0.268 | 18.9 | 0.286 | 645.5 | 0.43 | 35.1 | where Cat is catalyst and CoCat is cocatalyst both identified previously. conc is concentration TABLE 2b (Table 2a in SI units)

| Sample | Cat flow (kg/hr) | Cat conc (ppm) | CoCat Flow (kg/hr) | Co Cat Conc ppm | MMAO Flow (kg/hr) | MMAO Conc. (ppm) |
|---|---|---|---|---|---|---|
| ESI 3 | 0.129 | 10 | 0.126 | 326.3 | 0.208 | 17.6 |
| ESI 4 | 0.121 | 18.9 | 0.129 | 645.5 | 0.194 | 35.1 |

TABLE 3

Reactor Data

| Polymer | Reactor Temp. °C. | Solv. Flow lb/hr | kg/hr | Ethylene Flow lb/hr | kg/hr | Hydrogen Flow SCCM | Styrene lb/hr | Flow kg/hr | Ethylene Conv. % |
|---|---|---|---|---|---|---|---|---|---|
| ESI-1 (Example 1) | 101.9 | 19.2 | 8.72 | 1.99 | 0.90 | 4.0 | 7.0 | 3.18 | 87.72 |
| ESI-2 (Example 2) | 67.9 | 2.9 | 1.31 | 0.99 | 0.45 | 65.0 | 20.0 | 9.09 | 84.0 |
| ESI-3 (Examples 3–5) | 67.8 | 30 | 13.59 | 1.3 | 0.186 | 0 | 10 | 4.532 | 86.3 |
| ESI-4 (Examples 6–7) | 100.7 | 35.0 | 15.86 | 4.0 | 1.81 | 10 | 3 | 4.12 | 99.9 |

SCCM means standard cubic centimeter

Example 1 and C.S. A: Poly(Sulfonyl azides) Used for Coupling ESI

A mixer commercially available from C.W. Brabender Instruments Inc. consisting of a measuring head (Type R.E.E NO. A-19/S.B) and a temperature control console (Type SP-2003, NO 1382) was used. The mixer was heated to 180° C. The paddles were turned at 60 rpm and 50 g of ESI-1 (26 weight percent styrene interpolymer (the remainder being ethylene comonomer), 6 weight percent atactic polystyrene, of 1.0 MI (melt index)) prepared as outlined previously was added to the bowl. After 2 minutes of mixing, 0.1 g (0.26 mmole, 0.2 weight percent) of 4,4'-disulfonylazidophenyl ether was slowly sprinkled into the bowl. The paddle speed was increased to 80 rpm and the polymer mixed for 5 minutes. During the blending period the viscosity and elasticity of the polymer melt increased. The mixer bowl was removed and the polymer was scraped from the paddles and bowl to yield the polymer of Example 1.

For C.S. A the properties and gel content were measured on the ESI-1 sample without modification.

TABLE 4

| Sample | Gel % |
|---|---|
| C.S. A | 1.2 |
| Example 1 | 1.3 |

TABLE 5

| Sample | UST (TMA) ° C. | G' (20° C.) (dyne/cm$^2$) | G' (20° C.) (N/m$^2$) | G' (200° C.) (N/m$^2$) | G' (200° C.) (dyne/cm$^2$) |
|---|---|---|---|---|---|
| C.S. A | 86 | 5.0E+07 | 5.0E+08 | 1.0E+05 | 1.0E+04 |
| Example 1 | 89 | 5.0E+07 | 5.0E+08 | 2.0E+07 | 2.0E+06 |

TABLE 6

| Sample | Toughness (In-Lb/Cu. In) | Toughness (joule/cm$^3$) | Tensile at break (PSI) | Tensile at Break (kPa) | % Elongation at break |
|---|---|---|---|---|---|
| C.S. A | 11900 | 82.1 | 4100 | 28,270 | 615 |
| Example 1 | 10700 | 73.8 | 4000 | 27,580 | 600 |

The results of Example 1 show that sulfonyl azide can be used to rheology modify vinyl aromatic interpolymers. The increase in storage modulus G' at high temperature (100–200° C.) indicates that the coupling reaction occurs. The gel content data shows that the modified ESI is not crosslinked.

Example 2 and C.S. B: Coupling of High Styrene Content ESI (Styrene weight percent=73 percent)

A mixer commercially available from Haake Fusion Co. consisting of a HaakeBuchler Rheomix 600 mixer with roller style blades, attached to a HaakeBuchler Rheocord 9000 Torque rheometer The mixing bowl was heated to 170° C. An ESI-2 polymer sample (having 30.0 g/10 min MI and 75 weight percent of an interpolymer of ethylene and styrene containing 73.2 weight percent of styrene comonomer (the remainder being ethylene monomer) and 25.0 weight percent atactic polystyrene)) was loaded into the mixing bowl. After 1 minute, 0.12 g of 1,3-disulfonylazidebenzene (0.3 weight percent) was added to the mixer. Over a period of about 3 minutes the torque increased from 150 m-g to 350 m-g. After 10 minutes, the sample was removed from the Haake bowl to yield Example 2. The Melt Index and Upper Surface Temperature (TMA) of was measured. C.S. B is a sample of the untreated starting material.

TABLE 7

| Sample | UST (TMA) ° C. | MI(g/10 min) |
|---|---|---|
| C.S. B | 50 | 30 |
| Example 2 | 60 | 8.3 |

The results of Example 2 show that sulfonyl azide can be used to rheology modify vinyl aromatic interpolymers like ESI with high styrene content.

Examples 3–7 and C.S. C-F

Description of materials

Materials in Examples 3–12 and the corresponding Comparative Samples designated by the codes underlined are as follows:

LDPE 620 I polyethylene: Low density polyethylene (LDPE) (I2 of 1.85 g/10 min, density of 0.9239 g/cc) commercially available from The Dow Chemical Company under the trade designation LDPE 620 I polyethylene.

Nordel 2722 hydrocarbon rubber: an ethylene (72 weight percent) propylene (22 weight percent) ethylidene norbornene (6 weight percent)terpolymer with specific gravity 0.87, at 22.4° C., Mw/Mn=3.65 and Mw=115,200, Mooney viscosity 20, commercially available from DuPont Dow Elastomers LCC under the trade designation Nordel 2722 hydrocarbon rubber BSA: 4,4'-oxybis(benzenesulfonyl azide) CAS# [7456-68-0]

The bis(sulfonyl azide) is prepared by the reaction of sodium azide with the corresponding bis(sulfonyl chloride). The bis(sulfonyl chloride) is commercially available. Solid sodium azide is added to the acetone solution of the corresponding bis(sulfonyl chloride).

Control Sample C

A 0.400 kg sample of pellets of LDPE 620 I polyethylene defined previously was extruded on a twin screw extruder having a screw diameter of 18 mm commercially available from Haake Inc. under the trade designation Haake 18 Micro extruder having 5 zones each separated from the other by about 10 cm and each zone having a thermo-couple(inserted in the metal) to measure the temperature thereon using the following conditions: Screw speed: 100 rpm, Torque of 5300 mg, Pressure of 870 psi (6000 kPa), temperature: 150° C., 175° C., 201° C., 224° C., 225° C. and 214° C. for Zone 1, 2,3, 4, 5, and the exit die respectively.

Control Sample D

The rheologic properties of CS D (Table 8) were measured on commercially available Nordel 2722 hydrocarbon rubber described previously without modification.

Control Sample E

A 0.4 kg of sample of pellets of ESI-3 (having 31.3 weight percent styrene and 68.7 weight percent ethylene in the copolymer, 1 weight percent atactic polystyrene, and 0.98 g/10 min MI) was extruded using the same extruder conditions used in CS C.

C.S. F

A 0.4 kg sample of pellets of ESI-4 (70 weight percent styrene, 30 ethylene weight percent in copolymer, and 4.6 weight percent of atactic polystyrene, 1.36 g/10 min. MI) was extruded using the same extruder conditions used in C.S. C

Example 3

A solution of 5 weight percent of BSA in tetrahydrofuran (THF) was prepared. The BSA solution (4 g) was added to 400 g of ESI-3 (having 31.3 weight percent styrene and 68.7 weight percent ethylene in the copolymer, 1 weight percent atactic polystyrene, and 0.98 g/10 min MI), pellets in a one gallon polyethylene bag. The bag was shaken to disperse BSA evenly on the pellets. The bag was opened and placed in a hood for about 2 hr to let the acetone evaporate to form a formulated resin. The formulated resin. was extruded using the same extruder and extrusion conditions with used in Control Sample C.

Results of tests of viscosity, melt properties, and gel content are in Tables 8, 9 and 10, respectively.

Examples 4 and 5

The procedure of Example 3 was repeated except that the amounts of BSA listed in Table 8 were used.

Examples 6 and 7

The procedure of Example 3 was repeated except that the amounts of BSA listed in Table 8 were used and an ethylene styrene polymer with 70 weight percent of styrene incorporated therein designated previously as ESI-4 was used.

TABLE 8

Effect of Coupling on Viscosity

| Example or Sample Number | Description | Viscosity at 0.1 Rad/sec ($\times 10^5$) | Viscosity at 100 Rad/sec | Viscosity Ratio (0.1/100) |
| --- | --- | --- | --- | --- |
| C.S C | LDPE 620I polyethylene | 1.17 | 5470 | 21.5 |
| C.S. D | Nordel 2722 hydrocarbon rubber | 8.26 | 13100 | 62.8 |
| C.S. E | ESI 3 | 1.36 | 16900 | 8.0 |
| C.S. F | ESI 4 | 0.99 | 16000 | 6.2 |
| Ex. 3 | ESI 3, 0.05% BSA | 3.09 | 19100 | 16.2 |
| Ex. 4 | ESI 3, 0.1% BSA | 6.33 | 20700 | 30.6 |
| Ex. 5 | ESI 3, 0.15% BSA | 10.9 | 22800 | 47.8 |
| Ex. 6 | ESI 4, 0.05% BSA | 2.12 | 17600 | 12.0 |
| Ex. 7 | ESI 4, 0.1% BSA | 4.47 | 18700 | 23.9 |

TABLE 9

Effect of Coupling on Melt Strength, Melt Index, and Molecular Weight of interpolymers.

| Sample | Description | melt index (g/10 min) I2 | I10 | I20 | molecular weights Mw | Mn | Gott (cN) | Elongation (mm/s) |
| --- | --- | --- | --- | --- | --- | --- | --- | --- |
| C.S. C 1 | LDPE 620 I polyethylene | 1.14 | 15.51 | 69.63 | 141500 | 21400 | 18 | 155 |
| C.S. E | ESI 3 | 0.98 | 8.82 | 30.13 | 181700 | 65900 | 5.5 | 230 |
| C.S. F | ESI 4 | 1.36 | 9.25 | 39.63 | 233000 | 65500 | 5 | 210 |
| Ex. 3 | ESI-3, 0.05% BSA | 0.43 | 5.18 | 21.76 | 214300 | 70100 | 9 | 160 |
| Ex. 4 | ESI-3, 0.10% BSA | 0.18 | 4.03 | 28.01 | 239700 | 65300 | 14 | 145 |
| Ex. 5 | ESI-3, 0.15% BSA | 0.05 | 1.36 | 18.89 | 286800 | 73500 | 23 | 100 |
| Ex. 6 | ESI-4, 0.05% BSA | 0.63 | 6.38 | 37.68 | 265900 | 66100 | 11 | 160 |
| Ex. 7 | ESI-4, 0.1 % BSA | 0.28 | 3.46 | 16.69 | 366500 | 67600 | 21 | 55 |

The results in Table 9 indicate that the Gottfert melt strengths of the poly(sulfonyl azide) treated (coupled) samples are higher than the untreated samples of the same polymer.

High melt strength is desirable for many applications such as foam, wire cable, and profile extrusion. Control Sample C (Table 8) illustrates the viscosity behavior of LDPE 620 I polyethylene, a state of the art material for foam applications. Control Sample D (Table 8) illustrates the viscosity behavior of Nordel 2722 hydrocarbon rubber (EPDM, ethylene propylene diene terpolymer), a state of the art material for wire cable coating applications. LDPE 620 I polyethylene and Nordel 2722 hydrocarbon rubber have higher melt strength than the unmodified interpolymers of vinyl aromatic monomers and alpha olefins as illustrated here by Comparative Samples C.S. E and C.S. F. The melt strength is measured as Gottfert melt strength or the ratio of viscosity of low shear (0.1 Rad/sec) to high shear (100 Rad/sec). Both LDPE 620 I polyethylene (C.S. C) and Nordel 2722 hydrocarbon rubber (C.S. D) have higher ratio of low to high shear viscosity than untreated interpolymer samples (C.S. E and C.S. F). Treatment with azide increases significantly viscosity at low shear rate (0.1 rad/sec) and the ratio of low to high shear viscosity. The results in Table 8 show that azide can be used to modified the rheology of the interpolymers to achieve the low to high shear viscosity of LDPE or Nordel 2722 hydrocarbon rubber. The amount of azide used is dependent on styrene content of the interpolymer and the degree of rheology modification required for different applications.

TABLE 10

Effects of Azide on the Gel Content of ESI Samples

| Sample | Description | percent Gel |
|---|---|---|
| C.S. C | LDPE 620I polyethylene | 0.373 |
| C.S. E | ESI-3 | 0.358 |
| C.S. F | ESI-3 | 0.678 |
| Ex. 3 | ESI-3, 0.05% BSA | 0.461 |
| Ex. 4 | ESI-3, 0.1% BSA | 0.394 |
| Ex. 5 | ESI-3, 0.15% BSA | 0.372 |
| Ex. 6 | ESI-4, 0.05% BSA | 0.544 |

The azide treated interpolymer samples have comparable gel contents with the untreated samples (C.S. E and F). The results from Tables 8, 9 and 10 show that interpolymers with desirable melt strength, and rheology can be modified using poly(sulfonyl azide). The amount of azide is selectable to avoid the formation of excessive gel that can cause detrimental effects on the mechanical properties such as elongation and toughness of fabricated parts.

What is claimed is:

1. A process of preparing a coupled polymer comprising heating an admixture containing (1) at least one interpolymer of an alpha olefin and vinyl aromatic monomer and (2) a coupling amount of at least one poly(sulfonyl azide) to at least the decomposition temperature of the poly(sulfonyl azide) for a period sufficient for decomposition of at least about 80 weight percent of the poly(sulfonyl azide) and sufficient to result in a coupled polymer, such that the coupled polymer has a low shear viscosity at 0.1 rad/sec as measured by DMS at least about 5 percent higher compared with the starting material polymer and has less than about 2 weight percent gel as measured by ASTM D 2765-Procedure A.

2. The process of claim 1 wherein the interpolymer comprises ethylene, and a vinyl aromatic monomer.

3. The process of claim 1 wherein the amount of poly(sulfonyl azide) is from about 0.01 to about 1 weight percent of the interpolymer.

4. The process of claim 1 wherein the coupling agent comprises at least one poly(sulfonyl azide) which has a structure X—R—X wherein each X is $SO_2N_3$ and R represents an unsubstituted or inertly substituted hydrocarbyl, hydrocarbyl ether or silicon-containing group.

5. The process of claim 4 wherein at least one poly(sulfonyl azide) has sufficient carbon, oxygen or silicon, atoms to separate the sulfonyl azide groups sufficiently to permit a facile reaction between the elastomer and the sulfonyl azide.

6. The process of claim 4 wherein at least one poly(sulfonyl azide) has at least 3 but less than 50 carbon, silicon or oxygen atoms between sulfonyl azide groups.

7. The process of claim 4 wherein R includes at least one aryl group between the sulfonyl groups.

8. The process of claim 4 wherein R includes at least two aryl groups or wherein R is one aryl group, and the group has more than one ring.

9. The process of claim 4 wherein the poly(sulfonyl)azide is selected from 1, 5-pentane bis(sulfonyl azide), 1,8-octane bis(sulfonyl azide), 1,10-decane bis(sulfonyl azide), 1,10-octadecane bis(sulfonyl azide), 1-octyl-2,4,6-benzene tris(sulfonyl azide), 4,4'-diphenyl ether bis(sulfonyl azide), 1,6-bis(4'-sulfonazidophenyl)hexane, 2,7-naphthalene bis(sulfonyl azide), mixed sulfonyl azides of chlorinated aliphatic hydrocarbons containing an average of from 1 to 8 chlorine atoms and from about 2 to 5 sulfonyl azide groups per molecule, and mixtures thereof.

10. The process of claim 4 wherein the poly(sulfonyl azide)and elastomer react at a temperature at least the decomposition temperature and greater than about 150° C.

11. The process of claim 10 wherein the temperature greater than about 185° C.

12. The process of claim 1 additionally comprising steps (b) fabricating an article from the coupled polymer and (c) crosslinking the fabricated coupled polymer.

13. A composition comprising the reaction product formed by heating an admixture containing (1) at least one interpolymer of an alpha olefin and vinyl aromatic monomer and (2) a coupling amount of at least one poly(sulfonyl azide) to at least the decomposition temperature of the poly(sulfonyl azide) for a period sufficient for decomposition of at least about 80 weight percent of the poly(sulfonyl azide), wherein coupling is indicated by a viscosity increase at a shear frequency of 0.1 rad/sec of at least about 5% as measured by DMS compared to the starting material and less than about 2 weight percent gel as measured by ASTM D2765-Procedure A.

14. The composition of claim 13 wherein at least one interpolymer is an ethylene copolymer with at least one vinyl aromatic monomer.

15. The composition of claim 13 wherein at least one vinyl aromatic monomer is styrene.

16. An article which comprises a composition of claim 13.

17. An article wherein the article is formed from a melt of the composition of claim 13.

18. The process of formation of an article by blow molding, blowing a film, foaming, or profile extruding a composition of claim 13.

19. The article of claim 16 which is a coating for wire or cable, a tube, a gasket, a seal, roofing, or fiber.

20. The article of claim 16 which is calendared.

* * * * *